United States Patent
Park

(10) Patent No.: US 6,704,586 B2
(45) Date of Patent: Mar. 9, 2004

(54) RADIOTELEPHONE FOR VISUAL COMMUNICATION

(75) Inventor: Jun-Sang Park, Anyang-shi (KR)

(73) Assignee: Samsung Electronics Co., Ltd. (KR)

( * ) Notice: Subject to any disclaimer, the term of this patent is extended or adjusted under 35 U.S.C. 154(b) by 561 days.

(21) Appl. No.: 09/757,791

(22) Filed: Jan. 10, 2001

(65) Prior Publication Data

US 2001/0036845 A1 Nov. 1, 2001

(30) Foreign Application Priority Data

Jan. 10, 2000 (KR) .............................. 2000-915

(51) Int. Cl.[7] ................................................ H04M 1/00
(52) U.S. Cl. .................. 455/575.3; 348/211.2
(58) Field of Search ............................. 455/575.3, 556; 348/211.2, 14.02; 379/433.13

Primary Examiner—Nay Maung
Assistant Examiner—Tu Nguyen
(74) Attorney, Agent, or Firm—Dilworth & Barrese LLP

(57) ABSTRACT

A radiotelephone capable of visual communication, having a main body, a folder and a hinge device for rotatably coupling the folder to the main body. The main body includes first and second cylindrical side hinge arms, and the folder includes a cylindrical center hinge arm mounted between the first and second side hinge arms in a direction of a hinge axis. A rotary cylindrical lens housing is coupled to the first side hinge arm in the direction of the hinge axis. The lens housing includes a camera lens assembly and an opening through which a lens of the camera lens assembly is exposed to the outside. A flexible printed circuit board (PCB) electrically connects the camera lens assembly to the main body.

6 Claims, 5 Drawing Sheets

RADIOTELEPHONE FOR VISUAL COMMUNICATION

PRIORITY

This application claims priority to an application entitled "Radiotelephone for Visual Communication" filed in the Korean Industrial Property Office on Jan. 10, 2000 and assigned Ser. No. 2000-915, the contents of which are hereby incorporated by reference.

BACKGROUND OF THE INVENTION

1. Field of the Invention

The present invention relates generally to a radiotelephone, and in particular, to a radiotelephone capable of taking a picture of a subject and supporting a visual communication service.

2. Description of the Related Art

In general, a radiotelephone designed for voice communication or visual communication is classified into a bar type, a flip type and a folder type according to its external shape. The flip-type and folder-type radiotelephones are popular because they have good audio sensitivity and are advantageous for reducing the both size and weight of the main body.

A normal folder-type radiotelephone designed for voice communication includes a main body, a folder, and a hinge device for mechanically coupling the folder to the main body. The main body has a plurality of alphanumeric keys and function keys, provided as data input means, and a microphone device installed in the lower portion thereof. The folder has an earpiece, and a display unit provided as a data output means.

However, a radiotelephone designed for visual communication additionally includes a camera lens assembly mounted on the main body or the folder thereof. Therefore, if the user inadvertently drops the radiotelephone through carelessness, the camera lens assembly is apt to be damaged due to its structural fragility. This is because the camera lens assembly is typically protruding or is nakedly mounted on the radiotelephone away from the main body. The damage to the camera lens assembly usually disables the visual communication.

In the conventional radiotelephone, a lens system is usually nakedly mounted on the camera lens assembly, so that the lens system is always open to external impacts. In addition, the camera lens assembly impedes miniaturization and good external appearance of the radiotelephone.

SUMMARY OF THE INVENTION

It is, therefore, an object of the present invention to provide a radiotelephone capable of visual communication, which ensures the safety of a camera lens assembly positioned on the radiotelephone.

It is another object of the present invention to provide a radiotelephone capable of visual communication, in which a camera lens assembly is mounted in a hinge device attached to the radiotelephone.

It is further another object of the present invention to provide a radiotelephone capable of visual communication, capable of protecting a camera lens assembly from the external environment.

It is yet another object of the present invention to provide a radiotelephone capable of visual communication, in which a rotary camera lens assembly is mounted in a hinge arm on the radiotelephone.

To achieve the above and other objects, there is provided a radiotelephone capable of visual communication, having a main body, a folder and a hinge device for rotatably coupling the folder to the main body. The main body includes first and second cylindrical side hinge arms, and the folder includes a cylindrical center hinge arm mounted between the first and second side hinge arms in a direction of a hinge axis. A rotary cylindrical lens housing is coupled to the first side hinge arm in the direction of the hinge axis. The lens housing includes a camera lens assembly and an opening through which a lens of the camera lens assembly is exposed to the outside. A flexible printed circuit board (PCB) electrically connects the camera lens assembly to the main body.

The radiotelephone includes locking means mounted on the rotary cylindrical lens housing for locking the lens housing with respect to the main body, and also includes an angle adjusting knob for adjusting an angle of the lens, mounted on the rotary cylindrical lens housing. Furthermore, the radiotelephone includes an ear-microphone jack mounted in the second side hinge arm, and also includes restriction means for restricting rotation of the rotary lens housing. Preferably, the restriction means includes a stopper mounted on an inner wall of the first side hinge arm.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

Figure 1:
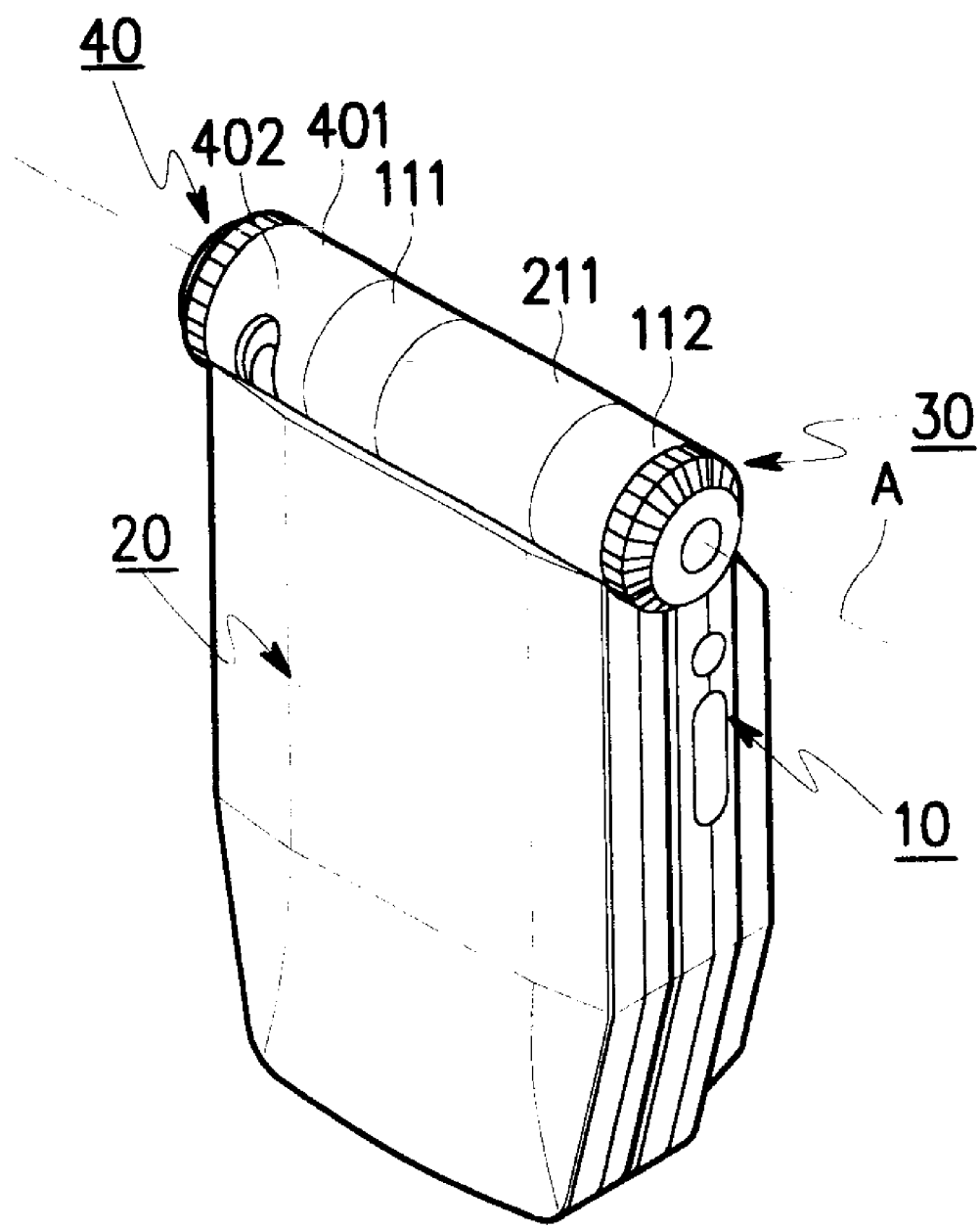
FIG. 1 is a perspective view illustrating a radiotelephone capable of visual communication, with a folder closed, according to an embodiment of the present invention.
Figure 2:
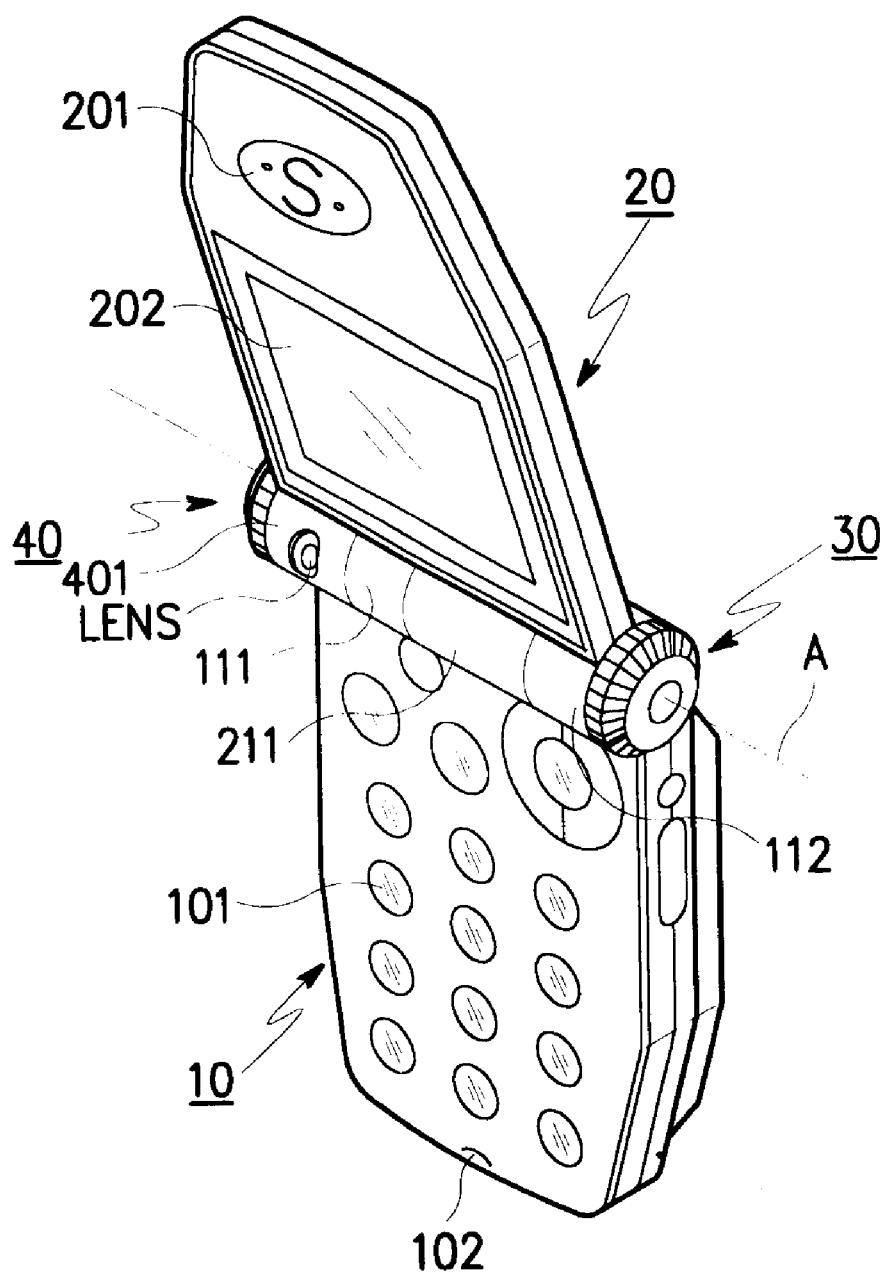
FIG. 2 is a perspective view illustrating the radiotelephone capable of visual communication, with the folder opened, according to an embodiment of the present invention.

FIG. 1 shows a radiotelephone with a folder closed according to an embodiment of the present invention, and FIG. 2 shows the radiotelephone of FIG. 1 with the folder opened. The radiotelephone is designed for visual as well as voice communication, and thus, has a camera lens assembly 40 mounted in a hinge device 30. Being mounted in the hinge device 30, the camera lens assembly 40 is structurally stable. The radiotelephone should be so structured as to duly endure an external impact caused by a careless dropping of the radiotelephone. For this reason, in the embodiment of the present invention, the camera lens assembly 40 is mounted in the hinge device 30. In addition, in order to protect a lens of the lens assembly 40 from the external environment, the camera lens assembly 40 is rotatably mounted in the hinge device 30. Therefore, the user can freely adjust an angle of the lens during visual communication and photographing. Further, when the radiotelephone is not in use, the user may adjust the angle of the lens to prevent the lens from being exposed to the outside to protect it from damage.

Referring to FIGS. 1 and 2, a folder-type radiotelephone according to an embodiment of the present invention includes a main body 10, a folder 20, and a hinge device 30 for mechanically coupling the folder 20 to the main body 10. The folder 20 is opened and closed against the main body 10 centering about a hinge axis A.

The hinge device 30 includes a plurality of hinge arms. More specifically, the hinge device 30 includes first and second side hinge arms 111 and 112 formed on the main body 10, a center hinge arm 211 formed on the folder 20, and a lens housing 401 rotatably coupled to the first side hinge arm 111 along a direction of the hinge axis A. The first and second side hinge arms 111 and 112 are spaced apart from each other, and the center hinge arm 211 is rotatably fixed into the space between the first and second side hinge arms 111 and 112. As shown in the drawings, the first and second side hinge arms 111 and 112, the center hinge arm 211 and the lens housing 401 are all placed along the hinge axis A. In addition, the first and second side hinge arms 111 and 112, the center hinge arm 211 and the lens housing 401 preferably are all cylindrical and have the same diameter. In the preferred embodiment, the center hinge arm 211 and the lens housing 401 are longer in axial length than the first and second side hinge arms 111 and 112.

The lens housing 401 according to the present invention has a hollow internal cavity in which the camera lens assembly 40 can be assembled. However, it is not necessary to assemble the camera lens assembly 40 in the lens housing 401. For example, the camera lens assembly 40 can be assembled in the center hinge arm 211 or can be mounted on the folder 20 with a separate hinge device.

The main body 10 includes a keypad 101 having a plurality of alphanumeric keys and function keys, and a microphone device 102. The folder 20 includes an earpiece 201 and a display unit 202. An antenna (not shown) is provided, and may be built into the main body 10. The camera lens assembly 40 is assembled in the lens housing 401 such that only the lens of the camera lens assembly 40 is exposed to the external environment.

Figure 3:
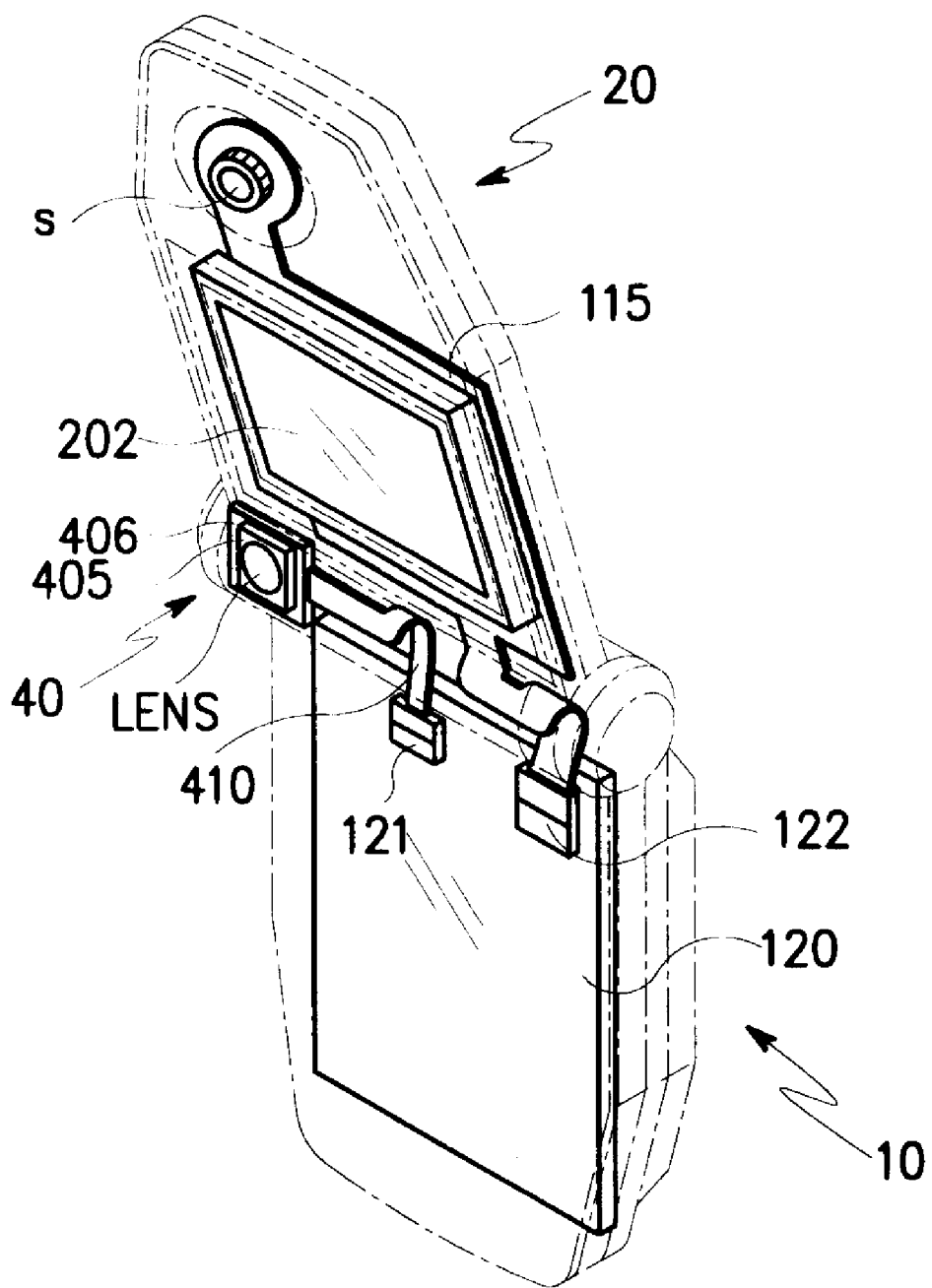
FIG. 3 is a perspective view illustrating a state where a camera lens assembly is electrically connected to a main board according to an embodiment of the present invention.

FIG. 3 shows a state where the camera lens assembly 40 is assembled in the lens housing 401 according to an embodiment of the present invention, in which the external components of the radiotelephone are shown in phantom.

Referring to FIG. 3, in the radiotelephone according to the present invention, the main body 10 includes a main board 120, and the folder 20 includes a speaker S and the display unit 202. As shown in the drawing, the camera lens assembly 40 includes a lens holder 405, a sub-board 406 and a charge-coupled device (CCD) mounted on the subboard 406. The CCD is not shown in the drawing because it is hidden by the lens holder 405.

The display unit 202 is electrically connected to the main board 120 by using a first flexible printed circuit board (PCB) 115. In addition, the sub-board 406 is electrically connected to the main board 120 by using a second flexible PCB 410. One end of the first flexible PCB 115 is electrically connected to a connector 122 mounted on the main board 120 via the center hinge arm 211 and the second side hinge arm 112. The second flexible PCB 410 is electrically connected to a connector 121 mounted on the main board 120 via the lens housing 401 and the first side hinge arm 111. Preferably, the connectors 121 and 122 are mounted at the edges of the main board 120 so as to minimize the distances from the camera lens assembly 40 and the display unit 202, respectively.

Figure 4:
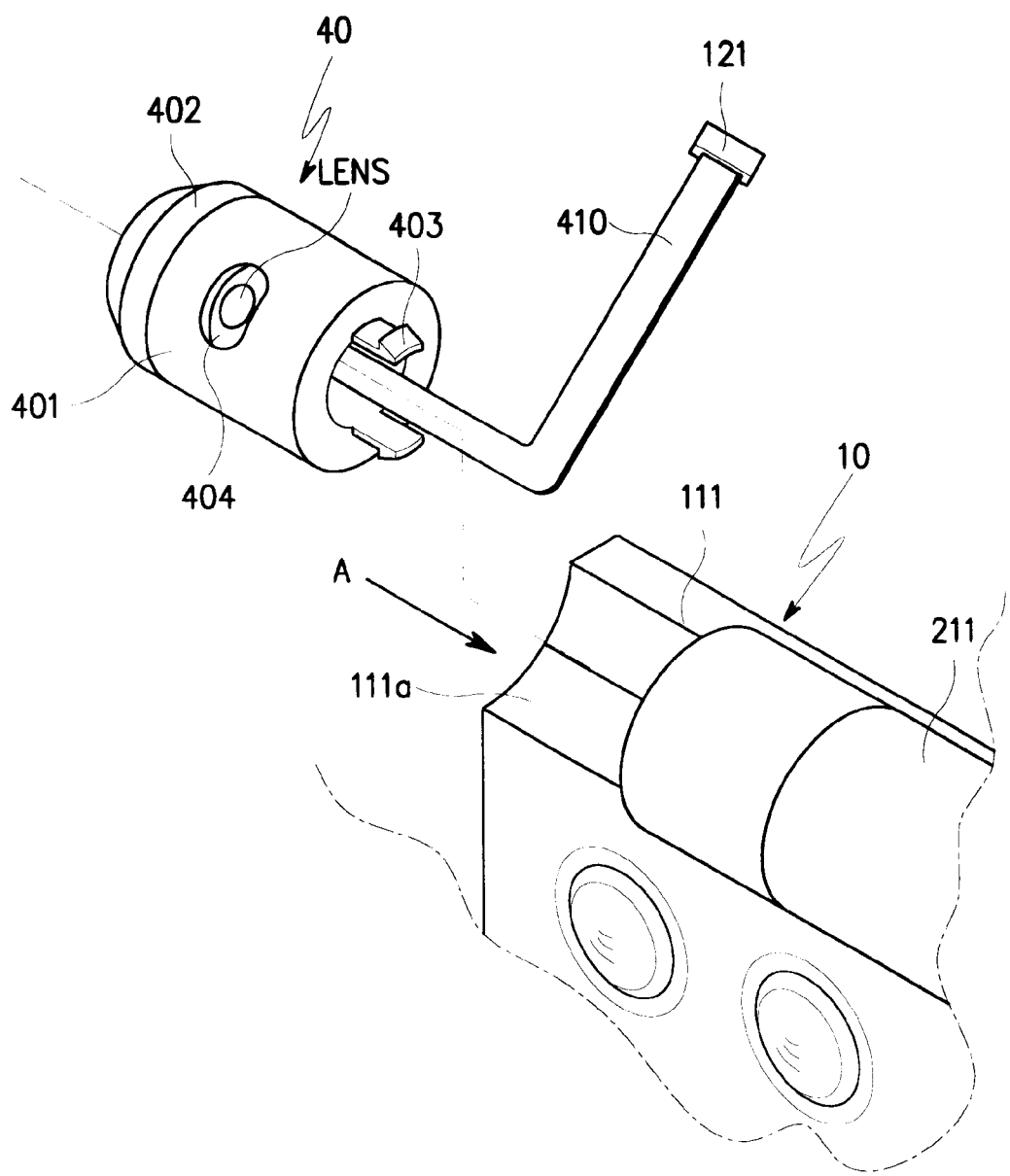
FIG. 4 is a partially-cut perspective view illustrating a state where a lens housing having the camera lens assembly is assembled in a main body according to an embodiment of the present invention.

FIG. 4 shows a state where the lens housing 401 is coupled to the hinge device 30 according to an embodiment of the present invention. The lens housing 401 is coupled to the first side hinge arm 111 by a pair of hooks 403 (or locking means). Once the hooks 403 are hooked in the first side hinge arm 111, the lens housing 401 is rotatably restricted to the first side hinge arm 111 in the direction of the hinge axis A. Of course, the lens housing 401 can be forcedly rotated on the hinge axis A by an external force. The main body 10 has a slot IIIa on which the lens housing 401 is to be mounted. The second flexible PCB 410 drawn from the lens housing 401 is connected to the connector 121 mounted on the main board 120, passing through the first side hinge arm 111. The lens housing 401 has an opening 404 through which a lens of the camera lens assembly 40 is exposed to the outside. Further, the lens housing 401 has an angle adjusting knob 402 provided at one end thereof, to help the user rotate the lens housing 401 to point the lens in a desired direction.

Figure 5:
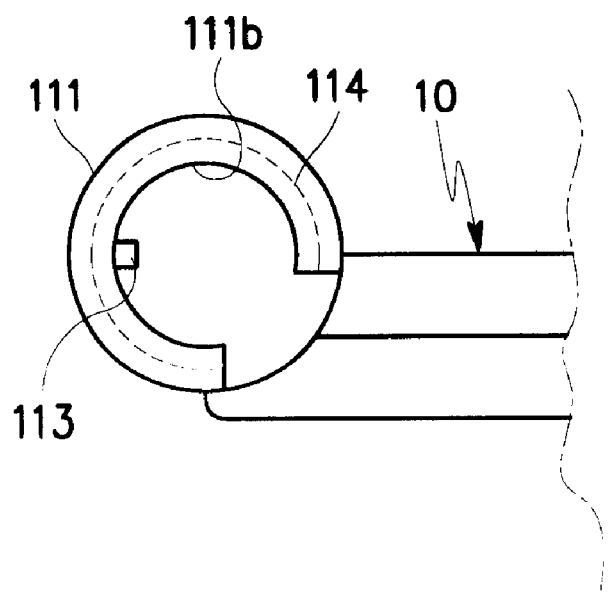
FIG. 5 is a diagram viewed in a direction A of FIG. 4.

Referring to FIG. 5, the radiotelephone according to the present invention includes restriction means for restricting rotation of the camera lens assembly 40, especially the lens housing 401. The restriction means is provided to prevent the second flexible PCB 410 from being twisted and disconnected due to free rotation of the lens housing 401. Preferably, the restriction means includes a stopper 113 mounted on inner wall 111b of the first side hinge arm 111. During rotation of the lens housing 401, one of the hooks 403 abut the stopper 113, thus restricting the rotation of the lens housing 401. Therefore, the rotating angle of the lens housing 401 can be varied according to the place where the stopper 113 is located, and by the number of stoppers. In the embodiment of the present invention, the rotating angle is set to about 90° for visual communication and photographing.

The present invention is applicable to every radio terminal for visual communication. For example, the invention can be equally applied to a notebook computer capable of supporting a visual communication service as well as the folder-type radiotelephone.

Figure 6:
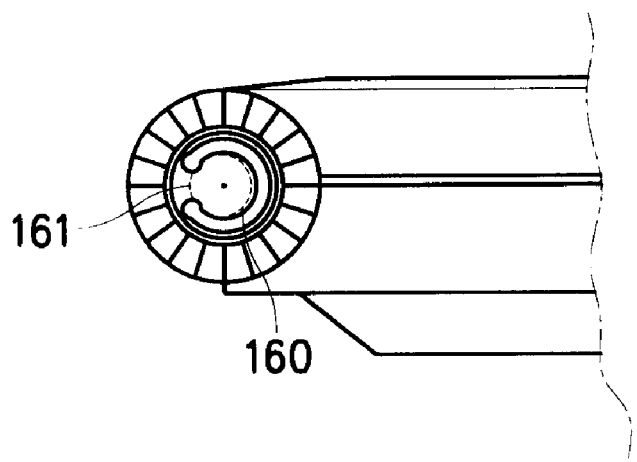
FIG. 6 is a side elevation view illustrating part of the radiotelephone according to an embodiment of the present invention.

Referring to FIG. 6, an ear-microphone jack 161 is mounted in the second side hinge arm 112 by using a hollow internal cavity of it. Further, an ear-microphone jack cover 160 is provided to protect the ear-microphone jack 161 from the external environment.

As described above, the camera lens assembly is mounted in the hinge device, contributing to miniaturization of the radiotelephone. In addition, the radiotelephone ensures the safety of the camera lens assembly and provides a good external appearance.

While the invention has been shown and described with reference to a certain preferred embodiment thereof, it will be understood by those skilled in the art that various changes in form and detail may be made therein without departing from the spirit and scope of the invention as defined by the appended claims. For example, the camera lens assembly can also be mounted on the main body or the folder of the radiotelephone, rather than on the hinge device, and would be protected by the main body of the radiotelephone.

What is claimed is:

1. A radiotelephone capable of visual communication, comprising a main body, a folder; a hinge device for rotatably coupling the folder to the main body, the hinge device:

including first and second cylindrical side hinge arms located on the main body, and a cylindrical center hinge arm located on the folder and mounted between the first and second side hinge arms in a direction of a hinge axis;

a rotary cylindrical lens housing coupled to the first side hinge arm in the direction of the hinge axis, the lens housing including a camera lens assembly and an opening through which a lens of the camera lens assembly is exposed; and a flexible printed circuit board (PCB) for electrically connecting the camera lens assembly to the main body.

2. The radiotelephone as claimed in claim 1, further comprising locking means mounted on the rotary cylindrical lens housing to secure the lens housing to the hinge device.

3. The radiotelephone as claimed in claim 1, further comprising an angle adjusting knob mounted on the rotary cylindrical lens housing for adjusting an angle of the lens.

4. The radiotelephone as claimed in claim 1, further comprising an ear-microphone jack mounted in the second side hinge arm.

5. The radiotelephone as claimed in claim 1, further comprising restriction means for restricting rotation of the rotary lens housing.

6. The radiotelephone as claimed in claim 5, wherein the restriction means comprises a stopper mounted on an inner wall of the first side hinge arm.

* * * * *